(12) United States Patent
Sugimoto et al.

(10) Patent No.: US 8,168,079 B2
(45) Date of Patent: May 1, 2012

(54) SOLID OXYGEN SCAVENGER COMPOSITION AND PROCESS FOR PRODUCING THE SAME

(75) Inventors: Ken Sugimoto, Tokyo (JP); Yoshinobu Miyabe, Chiba (JP); Masaharu Udagawa, Chiba (JP); Takahiro Seki, Chiba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/072,174

(22) Filed: Mar. 25, 2011

(65) Prior Publication Data
US 2011/0172091 A1 Jul. 14, 2011

Related U.S. Application Data

(62) Division of application No. 12/090,506, filed as application No. PCT/JP2006/320788 on Oct. 18, 2006, now Pat. No. 8,017,033.

(30) Foreign Application Priority Data

| Oct. 21, 2005 | (JP) | 2005-306569 |
| Jul. 14, 2006 | (JP) | 2006-194121 |
| Aug. 14, 2006 | (JP) | 2006-221153 |
| Sep. 25, 2006 | (JP) | 2006-258517 |

(51) Int. Cl.
*C01B 3/00* (2006.01)
*C09K 3/00* (2006.01)
*C08K 3/24* (2006.01)

(52) U.S. Cl. .................. 252/188.28; 252/190; 252/368; 252/385; 524/447

(58) Field of Classification Search ............. 252/188.8, 252/427, 428; 423/515, 221; 524/417; 428/327
See application file for complete search history.

(56) References Cited

U.S. PATENT DOCUMENTS

| 4,199,472 A | 4/1980 | Ohtsuka et al. |
| 4,524,015 A | 6/1985 | Takahashi et al. |
| 5,543,270 A | 8/1996 | Akao et al. |
| 5,744,056 A * | 4/1998 | Venkateshwaran et al. ............ 252/188.28 |
| 2001/0018480 A1 | 8/2001 | Chiang et al. |
| 2006/0163534 A1 | 7/2006 | Sugimoto et al. |

FOREIGN PATENT DOCUMENTS

| CN | 1332034 | 1/2002 |
| EP | 0 004 073 | 9/1979 |
| EP | 0 866 111 | 9/1998 |
| EP | 0 830 195 | 3/2004 |
| JP | 54-035883 | 3/1979 |
| JP | 56-078630 | 6/1981 |
| JP | 56-148272 | 11/1981 |
| JP | 56-150433 | 11/1981 |
| JP | 59-213440 | 12/1984 |
| JP | 59-232078 | 12/1984 |
| JP | 62-244444 | 10/1987 |
| JP | 10-235189 | 9/1998 |
| JP | 2003-144113 | * 5/2003 |

OTHER PUBLICATIONS

Chinese Official Action issued Feb. 5, 2010, for Application No. 200680032087.4. (Translation only).
Extended European Search Report, including Supplementary European Search Report and Search Opinion, dated Feb. 19, 2010, for Application No. EP 06 81 1981.
XP-002564785, www.dermachemci.com "Bentonite 670", 2 pages, 2008.
XP-002565786, "Carboxymethylcellulose", RÖMPP Online, Version 3.6, 2 pages, 2006.

* cited by examiner

*Primary Examiner* — Ling Choi
*Assistant Examiner* — Monique Peets
(74) *Attorney, Agent, or Firm* — Antonelli, Terry, Stout & Kraus, LLP.

(57) ABSTRACT

A molded oxygen absorbent composition and a process of producing the molded oxygen absorbent composition are disclosed. The molded oxygen absorbent composition is composed of a molded product of an oxygen absorbent composition which contains an oxygen absorbing substance, water or moisture, and a swelling component capable of being swelled with water or moisture. The product is formed by pressure molding the composition. The molded oxygen absorbent composition is reduced in its size and excellent in oxygen absorbing property.

7 Claims, No Drawings

SOLID OXYGEN SCAVENGER COMPOSITION AND PROCESS FOR PRODUCING THE SAME

This application is a Divisional application of prior application Ser. No. 12/090,506, filed Apr. 17, 2008, now U.S. Pat. No. 8,017,033, the contents of which are incorporated herein by reference in their entirety. No. 12/090,506 is a National Stage Application, filed under 35 USC 371, of International (PCT) Application No. PCT/JP2006/320788, filed Oct. 18, 2006.

TECHNICAL FIELD

The present invention relates to molded oxygen absorbent compositions. In more detail, it relates to molded oxygen absorbent compositions having a reduced size and an excellent oxygen absorbing property which is produced by a pressure molding and a process for producing the compositions.

BACKGROUND ART

In one of the preservation techniques for foods, and so on, an oxygen absorbent is used. In this method, a product to be preserved and an oxygen absorbent are both kept in a sealed gas barrier bag or a sealed container (hereinafter collectively referred to as "sealed container"). By allowing the oxygen in the sealed container to be absorbed in the oxygen absorbent and keeping the storage atmosphere in an oxygen free condition, the oxidative degradation of the quality of contents and the proliferation of bacteria or microorganism are prevented. This method has been extensively used for keeping the quality of products which are susceptible to oxidative degradation. In view of oxygen absorbing capability, ease of handling, safety, cost, and so on, oxygen absorbents containing an iron powder as the oxygen absorbing substance, i.e., as the main ingredient have been hitherto used. In the application requiring an inspection using a metal detector or an X-ray inspection system, an organic compound such as ascorbic acid and glycerol and so on is used as the main component instead of the iron powder.

The oxygen absorbent is required to be smaller in its size. The more small size reduces, the more a strange feel during the preservation of foods reduces and the more enables the application to a container with a limited space for the oxygen absorbent, to broaden the filed of application.

Since hitherto, oxygen absorbent pouches contained iron metal are usually produced directly from a powdery mixture, the volume of the pouch must be designed taking the spread of the powder upon filling into consideration. An oxygen absorbent needs water or moisture to exhibit its oxygen absorbing performance. Therefore, a water or moisture supplying component is required to add to the oxygen absorbing component to absorb oxygen even in an atmosphere having a relatively small water or low moisture content, thereby requiring a larger volume.

In these circumstances, it has been attempted to reduce the size by increasing the activity of the main ingredient so as to reduce the filling amount. For example, Patent Document 1 proposes to coat the main component iron powder with a metal halide. However, the increasing of activity have limited extent. Therefore, it is still demanded to develop other techniques.

In view of merely enhancing the activity, it is known that the oxygen absorbing speed and the oxygen absorbing rate can be improved by selecting an oxygen absorbing promoter. However, there is a problem that a well flowable mixture is not obtained, to make the filling package into pouches impossible.

In the above circumstances, it has been proposed to make a powdery mixture (oxygen absorbent composition) into a molded body, thereby preventing the scattering of powder to reduce the volume. On the basis of this proposal, there has been developed a tablet type oxygen absorbent which is independent of the atmospheric humidity.

However, the molding requires necessarily to reduce the volume by pressure. This reduces significantly the reactive surface area to make the oxygen absorbing speed extremely low. Therefore, the proposed technique cannot be used in the application which indispensably requires an ordinary oxygen absorbing speed, for example, a speed which reduces the oxygen concentration of atmosphere to less than 0.1% within about two days.

Moreover hitherto oxygen absorbents for the application which needs a foreign matter inspection using a metal detector or an X-ray inspection system have been produced by impregnating a carrier with a solution of an easily oxidizable main component organic substance composed of ascorbic acid and glycerol and so on.

Since the oxygen absorbing capacity per unit volume increases as the supported amount of the solution of easily oxidizable organic substance on the carrier is increased, a carrier capable of supporting a larger amount is used. As such carrier, a natural inorganic carrier has been hitherto used. Recently, the oxygen absorbing capacity is successfully improved by the use of a chemically synthesized carrier.

In the method of impregnating the carrier with the solution of the easily oxidizable organic substance, the supported amount of the solution is substantially constant if the kind of carrier is the same. Therefore, the content, i.e., the dissolved amount of the easily oxidizable organic substance in the solution is required to be larger for enhancing the oxygen absorbing capacity per unit volume. However, the oxygen absorbing speed is unfavorably reduced if a solution with a high concentration of the easily oxidizable organic substance is supported in a large amount. This may be due to the reduction in the reactive surface area necessary for the oxidation reaction.

Patent Document 1: JP 54-35883A

DISCLOSURE OF THE INVENTION

An object of the present invention is to solve problems that the pressure molding makes the gas permeability lower and makes the oxygen absorbing speed decreasing. That is, the present invention is to achieve the reduction in the size of an oxygen absorbent without reducing the oxygen absorbing speed by drastically increasing the oxygen absorbing capacity.

As a result of extensive research in view of the above problems in the prior arts, the inventors have found as follows. That is, an oxygen absorbent composition added with a swelling component capable of being swelled with water or moisture exhibits an oxygen absorbing property comparable to that of powdery mixtures even in the form of a pressure molded product. The present invention has been accomplished on the basis of this finding.

Thus, the present invention discloses a molded oxygen absorbent composition composed of a pressure molded product of an oxygen absorbent composition containing an oxygen absorbing substance, water or moisture, and a swelling component capable of being swelled with water or moisture.

The present invention also discloses a process for producing a molded oxygen absorbent composition, including a step of pressure molding an oxygen absorbent composition containing an oxygen absorbing substance, water or moisture, and a swelling component capable of being swelled with water or moisture.

The molded oxygen absorbent composition of the present invention is characterized to be excellent in the oxygen absorbing performance (in particular, oxygen absorption and oxygen absorbing speed), to have a large apparent specific density and to do not produce fine powders. Therefore, the same oxygen absorption in the present invention as obtained by the use of known oxygen absorbents is achieved by reduce amounts of the oxygen absorbent composition and packaging material, thereby providing an oxygen absorbent more reduced in its size.

BEST MODE FOR CARRYING OUT THE INVENTION

The molded oxygen absorbent composition of the present invention is composed of a main component (oxygen absorbing substance) and a promoter. The promoter includes water or moisture and a swelling component capable of being swelled with water or moisture. Other promoter for solving or moderating problems upon use may be used according to the kind of main component. Examples thereof include a component for promoting the oxidation reaction, a carrier for the main component or catalyst, a molded retaining component for maintaining the reaction, a component for preventing side reactions, a component for adsorbing by products, and a component for suppressing excessive heating upon the oxidation reaction.

The swelling component acts for preventing the oxygen absorbing reaction from being inhibited by the pressure molding, and used in a substantially dried state, in a semi swelled state absorbing a small or necessary amount of water or moisture, or in a swelled state. In addition to the above function, the essential swelling component preferably has either, particularly preferably has both the function as a lubricant for facilitating the extrusion of a mixture in the production, or particularly in the production by a continuous pressure molding and the function as a binder for maintaining the form of the pressure molded product.

Swelling components may be used in the present invention without any particular limitations. Examples of inorganic swelling components include clay minerals such as sodium bentonite, calcium bentonite and sodium montmorillonite. Examples of organic swelling components include organic bentonites; natural substances such as defatted frozen bean curd, agar, starch, dextrin, gum arabic, gelatin and casein; semi synthetic products such as crystalline cellulose, carboxymethylcellulose, sodium carboxymethylcellulose, calcium carboxymethylcellulose, hydroxyethylcellulose, ligninsulfonic acid and hydroxyethylated starch; and synthetic products such as water insolubilized polyvinyl alcohol and polyvinyl methyl ether.

Bentonite is a natural mineral mainly composed of montmorillonite which contains $SiO_2$ and $Al_2O_3$ as main components and has a ratio $SiO_2/Al_2O_3$ of 4.4 to 7.7 and 5.9 in average, and belongs to the montmorillonite group. The montmorillonite group includes montmorillonite, magnesian montmorillonite, iron montmorillonite, iron magnesian montmorillonite, beidellite, aluminian beidellite, nontronite, aluminian nontronite, saponite, aluminian saponite, hectorite, sauconite and volkonskoite. These minerals all have a three layered structure and a good water or moisture swelling property, and usable as the swelling component.

The clay minerals are preferably used because of low costs and excellent properties. The clay minerals are also known as inorganic soaps and have a function as a lubricant. Further, it is known that water or moisture swelled clay minerals have a high thixotropy and therefore show a suitable binding property. Also, cellulose based, semi synthetic products are preferable because of their good swelling property. Particularly preferred are bentonites such as calcium bentonite and sodium bentonite, carboxymethylcellulose, sodium carboxymethylcellulose and calcium carboxymethylcellulose.

The amount of the swelling component to be used is preferably from about 1 to about 20% by weight and more preferably from about 3 to about 15% by weight on the basis of the weight of the oxygen absorbent composition. When the oxygen absorbing component (main component) is iron powder, the amount of the swelling component to be used is preferably from 3 to 15 parts by weight and more preferably from about 5 to about 10 parts by weight per 100 parts by weight of the iron powder.

The content of water or moisture is selected from the range of about 1 to about 40% by weight of the oxygen absorbent composition.

In the molded oxygen absorbent composition of the present invention produced by pressure molding, the boundary of the water or moisture content varies mainly depending upon the kind of oxygen absorbing component (main component). By selecting the water or moisture content, the oxygen absorbent composition can be made into a water or moisture dependent type, a self reaction type or a boundary type which is intermediate between two preceding types. The water or moisture dependent type is an oxygen absorbent composition which initiates the substantial absorption of oxygen when the oxygen absorbing component is activated by the absorption of water or moisture transferred from the product being preserved into the oxygen absorbent composition. The self reaction type is an oxygen absorbent composition which nearly completes the absorption of oxygen only by the use of water or moisture originally contained in the composition.

Since the steps such as mixing, extrusion pressure molding and sizing are generally carried out under conditions such as an inert atmosphere and a reducing atmosphere, a part of water or moisture is lost by evaporation from the oxygen absorbent composition in these steps. The amount of lost water or moisture varies depending upon the components of the oxygen absorbent composition or operation conditions. When the amount of lost water or moisture exceeds an acceptable level, the water or moisture content is preferably controlled within the above range by changing the operation conditions or by adding water or moisture.

For example, the pressure molded, oxygen absorbent composition containing iron powder as the main component is of a water or moisture dependent type when water or moisture is used in an amount of from about 2 to about 17 parts by weight (from about 1 to about 10% by weight of the composition) and particularly from 8 to 15 parts by weight per 100 parts by weight of iron powder. When water or moisture is used in an amount of from about 30 to about 50 parts by weight (from about 20 to about 40% by weight of the composition) and particularly from 35 to 45 parts by weight per 100 parts by weight of iron powder, the oxygen absorbent composition is of a self reaction type. When water or moisture is used, for example, in an amount of from about 16 to about 33 parts by weight (from about 10 to 20% by weight of the composition) and particularly from 20 to 27 parts by weight per 100 parts by weight of iron powder, the oxygen absorbent composition is of a boundary type. As far as the inventors know, no oxygen absorbent composition of boundary type is on markets. The oxygen absorbent composition of boundary type initiates the oxygen absorbing reaction in the same way as in the oxygen absorbent composition of self reaction type. When the water evaporated from the product being preserved is not supplemented, the oxygen absorbent composition of boundary type can not help absorbing the oxygen in amount corresponding to the amount of water or moisture originally contained in the composition. When the water or moisture is consumed and becomes deficient, the oxygen absorbing reaction is terminated. If water or moisture is supplemented, the oxygen absorption is continued in the same way as in the water or moisture dependent type. The pressure molded, oxygen absorbent composition containing the organic main component such as ascorbic acid becomes a self reaction type when the water or moisture content is from about 5 to about 40% by weight and particularly from about 20 to about 30% by weight of the oxygen absorbent composition.

The main component of the oxygen absorbent composition, namely the oxygen absorbing substance, may be selected from the group consisting of metal components such as iron powder; ascorbic acid and its salts (inclusive of erythorbic acid as an isomer of ascorbic acid and salts thereof); 1,2-glycols such as glycerol, ethylene glycol and propylene glycol; polyhydric alcohols such as glyceric acid; polyhydric phenols such as gallic acid and catechol; and low to high molecular substances having an unsaturated bond or other easily oxidizable moiety such as unsaturated hydrocarbons and hydrogenated rubbers. The main component can be used alone or in combination of two or more. In the present invention, preferred are iron powder and the organic compounds such as ascorbic acid, its salts, and gallic acid which have been well recognized as effective oxygen absorbents.

Iron powders generally used in the art can be used in the present invention without particular limitation. Examples of iron powder usable in the present invention include atomized iron powders, sponge reduced iron powders, cast iron powders, electrolytic reduced iron powders and carbonyl iron powders, with sponge reduced iron powders being preferred in view of the purity and good oxygen absorbing property. The particle size is preferably from 1 to 150 μm and more preferably from 1 to 100 μm. Since the iron powder is compressed under high pressure, a broader particle size distribution is rather preferable. The content of iron powder in the oxygen absorbent composition is preferably from 40 to 90% by weight and particularly preferably from 50 to 80% by weight of the oxygen absorbent composition.

Examples of the ascorbic acid and its salts include L-ascorbic acid, salts such as sodium L-ascorbate (vitamin C), erythorbic acid (=isoascorbic acid) as an isomer of ascorbic acid, and salts such as sodium erythorbate. As compared with the known production methods, the activity of oxidative reaction can be enhanced in the production method of the present invention. Therefore, erythorbic acid and its salts such as sodium erythorbate, which are costly more advantageous, are preferably used. Also, gallic acid can be suitably used. If these organic compounds are used as the main component, its content is preferably from 15 to 70% by weight and more preferably from 45 to 60% by weight of the oxygen absorbent composition.

The molded oxygen absorbent composition of the present invention may further contain a promoter besides water or moisture and the swelling component.

Besides water or moisture and the swelling component, metal halides and activated carbon are preferably used as the promoter for the molded oxygen absorbent composition containing iron powder as the main component.

If the main component is an organic compound such as ascorbic acids and gallic acid, the promoter other than water or moisture and the swelling component is suitably selected from alkali agents, for example, alkali metal or alkaline earth metal compounds such as sodium carbonate; transition metal catalysts such as iron salts, manganese salts, copper salts and cobalt salts; reaction accelerators such as phenol compounds; carbon dioxide gas controllers such as carbonates and bicarbonates; and activated carbons.

The amount of the promoter to be used is preferably from 1 to 50% by weight of the oxygen absorbent composition, with from 2 to 10% by weight being particularly preferred for the catalyst and from 5 to 15% by weight being particularly preferred for the alkali substance and the carbon dioxide gas controller.

Any known activated carbons are usable and the raw materials are not particularly limited. In view of the ease of handling and reactivity, charcoal-based and coconut shell-based activated carbons are preferably used. The amount to be added is preferably from 3 to 30% by weight and particularly preferably from 5 to 15% by weight of the oxygen absorbent composition.

In the production of the molded oxygen absorbent composition containing iron powder as the main component, the metal halide may be mechanically mixed with iron powder or the metal halide may be coated on or dispersively attached to the surface of iron powder. Since the metal halide plays a role of absorbing water or moisture in the surrounding atmosphere, the method of mechanically mixing and the method of partly coating the surface of iron powder are preferred because the content of the metal halide can be increased.

Any of known metal halides may be used without particular limitation. In view of the ease of handling and safety, preferred are calcium chloride, sodium chloride, calcium bromide, sodium bromide, calcium iodide and sodium iodide.

The metal halide enhances the activity of iron, and also, plays a role of absorbing water or moisture in the surrounding atmosphere when the composition is of a water or moisture dependent type, or a role of preventing the loss of water from the oxygen absorbent by the evaporation into the surrounding low humidity atmosphere when the composition is a self reaction type. The amount to be used is preferably from 0.5 to 15% by weight and particularly preferably from 1 to 10% by weight of the oxygen absorbent composition, and preferably from 0.5 to 20 parts by weight and particularly preferably from 2 to 10 parts per 100 parts by weight of iron powder in the composition.

In addition to the components described above, a pressure molding additive is preferably used to more stably carry out the pressure molding, in particular, a roll type continuous pressure molding. As the pressure molding additive, a hydrophilic or water soluble thickener can be used alone or in combination with a hydrophobic wax. Examples of the thickener include polysaccharides such as xanthan gum, gum arabic, carageenan, locust bean gum, guar gum, tamarind, karaya gum, pectin and tara gum. Examples of the hydrophobic wax include low molecular weight polymers having a molecular weight of preferably from 500 to 10000 and more preferably from 1000 to 6000, polyethylene, polypropylene, phenoxy resins, petroleum resins, dicyclopentadiene resins and low molecular weight polystyrene. When the thickener is used alone, the amount to be added is preferably from 0.2 to 6% by weight and more preferably from 0.6 to 4.5% by weight of the oxygen absorbent composition. When used in combination with the hydrophobic wax, the amount to be added is, for each component, preferably from 0.1 to 4.5% by weight and more preferably from 0.3 to 4% by weight of the oxygen absorbent composition.

The molded oxygen absorbent composition of the present invention can be produced by mixing the above components with each other to prepare an oxygen absorbent composition, pressure molding the oxygen absorbent composition and, if required, granulating the pressure molded product.

Since the main component of the oxygen absorbent reacts with oxygen, the reaction with oxygen gradually proceeds even in the absence of the promoter (reaction accelerating components such as catalysts), for example, water, the metal halide and the transition metal catalyst. In the production steps such as mixing, pressure molding and granulating, a large amount of a mixture of the main component and the catalyst, etc. is treated. Therefore, it is preferred to carry out each of the production steps in an inert atmosphere (carried out in an oxygen free, reducing atmosphere if the system is substantially sealed), while removing the generated heat, if necessary.

When using iron powder based main component, it is required to uniformly mixing the components that are largely different in specific density, hardness, etc. Therefore, the mixing is preferably performed using an apparatus capable of applying a shear force and having a high abrasion resistance.

The pressure molding method is not particularly limited, and there can be used various methods such as tableting, briquetting, extrusion granulating, extrusion pressure molding and compacting, with the compacting method being preferred in view of good productivity and uniform quality of granulated product. In the compacting method, uniformly mixed raw materials are pressure molded into a plate using a compactor, crushed (disintegrated) if necessary, and then made into a granulated product having a uniform particle size of usually about 0.5 to about 2.0 mmφ. The pressure of the compactor is preferably controlled so as to obtain a sheet or flake through a step of compacting the mixture for increasing the apparent specific density being charged into a hopper, preferably from 2 to 4 times and more preferably from 2.5 to 3.5 times. In the roll compression method, the roll compression linear pressure is preferably from 1.0 to 4.0 t/cm and more preferably from 1.2 to 3.5 t/cm. The upper density limit of the obtained pressure molded product of sheet or flake form is governed by the closest packing condition under normal pressure and not directly related to the compression ratio upon the pressure compressing operation.

The apparent specific density of the granulated product obtained by granulating the obtained pressure molded product of sheet or flake form is preferably 1.3 times or more, more preferably from 1.3 to 3 times and still more preferably from 1.5 to 3 times (⅔ to ⅓ times as the apparent volume) that of the mixture being charged into a hopper. The apparent specific density is measured according to JIS K 6720-2. More specifically, the starting mixture (mixture being charged into a hopper) or the sized, granulated product (oxygen absorbent) is placed in a 100-mL container to measure its total weight. The apparent specific density is calculated from the measured weight. The apparent specific density (times) is expressed by the value of (apparent specific density of granulated product)/(apparent specific density of starting mixture).

The oxygen absorbent is produced by packing the thus obtained granulated product having a uniform particle size (molded oxygen absorbent composition) in a packaging material having a desired air permeability by a known method.

A non-pressure molded product and powder, which are generated in the pressure molding or sizing, are reused as a starting mixture. It is properly preferred to reduce the reuse, i.e., minimize the generation of the non-pressure molded raw mixture and powder.

EXAMPLES

The present invention will be described in more detail by referring to the following examples and comparative examples. However, it should be noted that these examples are not intended to limit the scope of the invention thereto. In the following examples and comparative examples, "part(s)" and "%" are based on the weight unless otherwise specified.

Example 1

An oxygen absorbent composition was prepared by mixing 100 parts (63.4%) of iron powder, 7.7 parts (4.9%) of calcium chloride, 19.2 parts (12.2%) of activated carbon, 15.4 parts (9.75%) of calcium bentonite ("Kunibond" (tradename) available from Kunimine Industries Co., Ltd.) as a swelling component, and 15.4 parts (9.75%) of water.

Using a compactor ("MRCP-80" available from Kurimoto, Ltd.), 5 kg of the oxygen absorbent composition was extruded and continuously pressure molded to about ⅓ of the original size by a roll compression (roll compression linear pressure: 2.5 t/cm), thereby obtaining a compression molded, pressure molded product of plate form having a thickness of 0.8 mm.

The pressure molded product of plate form was passed through a glanulator, to produce a molded oxygen absorbent composition having a particle size of about 2 mmφ and an apparent specific density of about 1.5 times that of the starting mixture (mixture being charged into the hopper), which is hereinafter referred to as "apparent specific density of XX times."

Next, 1 g of the obtained molded oxygen absorbent composition was packed in a gas barrier bag made from a Nylon/Polyethylene laminated film. Further, a cotton impregnated with a humectant was introduced into the bag together with 1500 mL of air to make the relative humidity to a predetermined level, and then the bag was hermetically sealed. The sealed bag was held at room temperature (25° C.) and the oxygen absorption was measured after two days. The results are shown in Table 1.

Upon comparing the oxygen absorptions after 2 days, it was found that the plate product showed lower oxygen absorption than that of the granulated product, but showed the same oxygen absorption as that of the granulated product after 7 days.

Example 2

The same procedure as in Example 1 was repeated except for changing the swelling component to 7.7 parts (5.1%) of sodium bentonite, to produce a granular oxygen absorbent composition, and the oxygen absorption was measured. The results are shown in Table 1.

Example 3

The same procedure as in Example 1 was repeated except for changing the swelling component to a mixture of 3.85 parts of sodium carboxymethylcellulose and 3.85 parts of calcium carboxymethylcellulose, to produce a granular oxygen absorbent composition (composed of 66.7% of iron powder, 5.1% of calcium chloride, 12.8% of activated carbon, 5.1% of the swelling component and 10.3% of water), and the oxygen absorption was measured. The results are shown in Table 1.

Comparative Example 1

The same procedure as in Example 1 was repeated except for omitting the use of the swelling component (calcium bentonite), to produce an oxygen absorbent composition. It was tried to pressure mold the oxygen absorbent composition using the same apparatus as used in Example 1, but no pressure molded product was obtained.

The oxygen absorbent composition was poor in fluidity and readily separated into respective components because of the difference in specific density, and therefore, unsuitable for metering and packaging. During the oxygen absorption test using the oxygen absorbent composition, a liquid containing iron rust oozed from the composition and spread in the vicinity. Therefore, the oxygen absorbent composition was inappropriate for use, because not only the packaging material but also the product being preserved could be contaminated.

A stainless cylinder having a diameter of 10 mmφ of a jack press ("J-1" (product name) available from Azuwan Corporation) was charged with 1.0 g of the oxygen absorbent composition prepared above. After closing the cylinder, a pressure molding was carried out under a pressure of 900 kg, to obtain a molded oxygen absorbent composition having a thickness of 7 mm, which was then measured for the oxygen absorption. After 7 days, the oxygen absorption was drastically reduced to as low as 53 cc/g composition which was clearly low as compared with Reference Example 3 described below.

Reference Example 1

A known oxygen absorbent product ("Ageless FX-type" (tradename) available from Mitsubishi Gas Chemical Company, Inc.) was measured for the oxygen absorption in the same way as in Example 1. The results are shown in Table 1.

From Table 1, it was found that the water or moisture dependent, molded oxygen absorbent composition of the present invention, although being pressured and granulated, exhibited an oxygen absorbing speed substantially the same as that of the known oxygen absorbent product used in Reference Example 1, and exhibited an oxygen absorption 1.2 to 1.5 times that of the known product used in Reference Example 1 when compared in the same weight for use. Further, the molded oxygen absorbent composition of the present invention had a good oxygen absorbing performance even at humidity as low as 60%.

The granulated product of Example 1 showed an extremely high oxygen absorbing property, because the oxygen absorption rate (%) defined as a ratio to the oxygen absorption when all iron was oxidized (theoretical oxygen absorption) was 98% after being held under 100% humidity for 2 days. As previously noted, a part of water is lost during the mixing step of the raw materials and the production step. In Example 1, water was also lost during the production step, in particular, a larger amount of water was lost during the pressure molding step, to increase the iron content in the oxygen absorbent composition from 63.4% at the stage of charging the raw materials to 66.7%.

During the oxygen absorbing process, all the oxygen absorbents shown in Table 1 changed from a black block (plate or granule) to reddish brown granules that easily crumbled into powders.

TABLE 1

| | | Oxygen absorption after 2 days (cc/g composition) | | |
|---|---|---|---|---|
| | | 100% RH | 80% RH | 60% RH |
| Example 1 | granulated product | 214 | 176 | 73 |
| | plate product | 140 | 112 | 45 |
| Example 2 | granulated product | 171 | 159 | 75 |
| Example 3 | granulated product | 152 | — | — |
| Reference Example 1 | known product (powder) | 142 | 86 | 31 |

Example 4

An oxygen absorbent composition was prepared by mixing 26 parts (60.0%) of iron powder, 2 parts (4.6%) of calcium chloride, 6 parts (13.9%) of activated carbon, 3 parts (6.3%) of calcium bentonite as a swelling component, 1 part (2.3%) of calcium carboxymethylcellulose and 6 parts (12.9%) of water.

Using a compactor ("MRCP-80" available from Kurimoto, Ltd.), 5 kg of the oxygen absorbent composition was extruded and continuously pressure molded to about ⅓ of the original size by a roll compression (roll compression linear pressure: 2.5 t/cm), thereby obtaining a pressure molded product of plate form having a thickness of 0.8 mm. The pressure molded product of plate form was passed through a granulator, to produce a molded oxygen absorbent composition having a particle size of about 2 mmφ.

Next, 1 g of the obtained molded oxygen absorbent composition was packed in a gas barrier bag made from a Nylon/Polyethylene laminated film. Further, a sealed package of a cotton impregnated with a humectant was introduced into the bag together with 1500 mL of air of 50% relative humidity, and then the bag was hermetically sealed. The sealed bag was held at room temperature (25° C.) and the oxygen absorption was measured after 1 day and 2 days.

After 2 days, it was recognized that the oxygen absorption was substantially completed. Thereafter, the sealed package of a cotton impregnated with a humectant in the gas barrier bag was broken to initiate the moisture conditioning of the atmosphere in the gas barrier bag. After 2 days, the oxygen absorption was measured. The results are shown in Table 2.

As seen from Table 2, when the amount of water in the pressure molded, molded oxygen absorbent composition was used larger than the amount in a water or moisture dependent type composition, but less than the required amount for the complete oxygen absorption, the oxygen absorption reaction started in the same way as in a self reaction type composition. Thereafter, the oxygen absorption reaction discontinued because of the deficiency of water after absorbing oxygen in an amount corresponding to the amount of water initially supported, if water was not supplemented from the atmosphere in the package. If water was supplemented from the atmosphere in the package, the oxygen absorption started and continued in the same way as in a water or moisture dependent type composition.

TABLE 2

| | Oxygen Absorption (cc/g composition) | | |
|---|---|---|---|
| | 50% RH | | 100% RH 2 days after initiation |
| | after 1 day | after 2 days | of moisture conditioning |
| Example 4 | 81 | 88 | 161 |

Example 5

An oxygen absorbent composition was prepared by mixing 100 parts (62.8%) of iron powder, 1.25 parts (0.8%) of calcium chloride, 11.25 parts (7.1%) of activated carbon, 3.75 parts (2.3%) of calcium bentonite ("Kunibond" (tradename) available from Kunimine Industries Co., Ltd.) and 3.25 parts (2.0%) of calcium carboxymethylcellulose ("E.C.G-505" (tradename) available from Nichirin Chemical Industries, Ltd.) as a swelling component, 0.94 part (0.6%) of tara gum ("White Gum" (tradename) available from Iwate Chemical Co., Ltd.) as a pressure molding additive, 1.25 parts (0.8%) of a polyethylene wax ("Sun Wax 171P" (tradename) available from Sanyo Chemical Industries, Ltd.) and 37.5 parts (23.6%) of water.

Using a compactor ("MRCP-80" available from Kurimoto, Ltd.), 5 kg of the oxygen absorbent composition was extruded and continuously pressure molded by a roll compression (roll compression linear pressure: 1.7 t/cm), thereby obtaining a pressure molded product of plate form having a thickness of 0.9 mm. The pressure molded product of plate form was passed through a granulator, to produce a molded oxygen absorbent composition of granular form having a particle size of about 2 mm$\phi$ and an apparent specific density of about 1.5 times.

Next, 1 g of the obtained molded oxygen absorbent composition of granular form was packed in a gas barrier bag made from a Nylon/Polyethylene laminated film. Further, 1500 mL of air of 50% relative humidity was introduced into the bag, and then the bag was hermetically sealed. The sealed bag was held at room temperature (25° C.) and a lower temperature (chilled at 5° C.), and the oxygen absorption was measured after 1 day and 7 days. The results are shown in Tables 3 and 4.

Reference Example 2

A known self reaction type oxygen absorbent ("Ageless SA-type" (tradename) available from Mitsubishi Gas Chemical Company, Inc.) was measured for the oxygen absorption in the same way as in Example 5. The results are shown in Tables 3 and 4.

Reference Example 3

A known tablet oxygen absorbent ("Ageless T-type" (tradename) available from Mitsubishi Gas Chemical Company, Inc.) was measured for the oxygen absorption in the same way as in Example 5. The results are shown in Table 3.

As seen from Tables 3 and 4, although being pressured and granulated, the self reaction type, molded oxygen absorbent compositions of the present invention in both the plate and granular forms exhibited the oxygen absorption (after 1 day and 7 days) well comparable to that of the non-molded mixture, particularly, showed a high oxygen absorption even under chilled condition. In contrast, it was recognized that the known tablet oxygen absorbent exhibited an extremely low oxygen absorbing speed. The oxygen absorbent compositions (plate product, granulated product and non-molded product) exhibited an excellent oxygen absorption which was higher than that of the known products by 1.5 times.

During the oxygen absorbing process, each of the molded oxygen absorbent compositions of the present invention changed from a black block (plate or granule) having a large apparent specific density to a swelled, reddish brown block that was easy to disintegrate. Since the non-molded mixture of Example 5 was little flowable and easy to form a block, the production steps such as automatic metering and packing into pouches were difficult, to make the production of pouch products impossible.

TABLE 3

Room Temperature (25° C.), 50% RH

| | | Oxygen absorption (cc/g composition) | |
|---|---|---|---|
| | | after 1 day | after 7 days |
| Example 5 | granulated product | 160 | 175 |
| | plate product | 154 | 172 |
| | non-molded mixture | 167 | 174 |
| Reference Example 2 | known product (powder) | 103 | 121 |
| Reference Example 3 | known product (tablet) | 27 | 78 |

TABLE 4

Chilled (5° C.), 50% RH

| | | Oxygen absorption (cc/g composition) | |
|---|---|---|---|
| | | after 1 day | after 7 days |
| Example 5 | granulated product | 126 | 149 |
| | plate product | 122 | 142 |
| | non-molded mixture | 128 | 146 |
| Reference Example 2 | known product (powder) | 63 | 100 |

Example 6

An oxygen absorbent composition was prepared by mixing 100 parts (46.5%) of sodium erythorbate, 8.3 parts (3.9%) of iron(II) sulfate, 23.3 parts (10.9%) of sodium carbonate, 21.7 parts (10.1%) of activated carbon, 10 parts (4.7%) of sodium bentonite ("Neokunibond" (tradename) available from Kunimine Industries Co., Ltd.) and 5.0 parts (2.3%) of calcium carboxymethyl cellulose ("E. C. G-505" (tradename) available from Nichirin Chemical Industries, Ltd.) as a swelling component, 3.3 parts (1.6%) of tara gum as a pressure molding additive ("White Gum" (tradename) available from Iwate Chemical Co., Ltd.) and 43.3 parts (20.2%) of water.

Using a compactor ("MRCP-80" available from Kurimoto, Ltd.), 5 kg of the oxygen absorbent composition was extruded and continuously pressure molded by a roll compression (roll compression linear pressure: 2.2 t/cm), thereby obtaining a pressure molded product of plate form having a thickness of 0.8 mm. The pressure molded product of plate form was passed through a glanulator, to produce a molded oxygen absorbent composition of granular form having a particle size of about 1.5 mm$\phi$ and an apparent specific density of about 1.5 times.

Next, 1 g of the obtained molded oxygen absorbent composition of granular form was packed in a gas barrier bag made from a Nylon/Polyethylene laminated film. Further, 1500 mL of air of 50% relative humidity was introduced into the bag, and then the bag was hermetically sealed. The sealed bag was held at room temperature (25° C.), and the oxygen absorption was measured after 2 day and 7 days. The results are shown in Table 5.

Comparative Example 2

The same procedure as in Example 6 was repeated except for omitting the use of the swelling component (calcium carboxymethylcellulose and sodium bentonite), thereby producing an oxygen absorbent composition. It was tried to pressure mold the oxygen absorbent composition using the same apparatus as used in Example 6, but no pressure molded product was obtained.

Reference Example 4

The oxygen absorption was measured in the same way as in Example 1 except for using 1 g of a known oxygen absorbent containing sodium L-ascorbate as the main component ("Ageless GT-type" (tradename) available from Mitsubishi Gas Chemical Company, Inc.). The results are shown in Table 5.

As seen from Table 5, although being pressured and granulated, the self reaction type, molded oxygen absorbent composition of the present invention exhibited the oxygen absorbing speed and oxygen absorption which were well comparable to those of the raw powdery mixture. The oxygen absorption was considerably higher than that of the known product.

The molded oxygen absorbent composition of the present invention was in the form of a black block (plate or granule), and even after absorbing oxygen, maintained the same color and shape as those before the oxygen absorption test. However, when being held under a moistened condition (100% RH) for a long period of time, the composition gelled. When being held under a dried condition (together with dried calcium chloride) for a long period of time, the surface of the oxygen absorbent composition changed gray and hard.

TABLE 5

| | | 50% RH | |
|---|---|---|---|
| | | Oxygen absorption (cc/g composition) | |
| | | after 2 days | after 7 days |
| Example 6 | granulated product | 91 | 119 |
| | plate product | 87 | 116 |
| | non-molded mixture | 78 | 120 |
| Reference Example 4 | known product (powder) | 69 | 73 |

Example 7

An oxygen absorbent composition was prepared by mixing 100 parts (58.8%) of sodium erythorbate, 13.3 parts (7.8%) of iron(II) sulfate, 20.0 parts (11.8%) of sodium carbonate, 15.0 parts (8.8%) of activated carbon, 1.7 parts (1.0%) of sodium bentonite ("Neokunibond" (tradename) available from Kunimine Industries Co., Ltd.) as a swelling component, and 20.0 parts (11.8%) of water.

Using a compactor ("MRCP-80" available from Kurimoto, Ltd.), 5 kg of the oxygen absorbent composition was extruded and continuously pressure molded by a roll compression (roll compression linear pressure: 2.2 t/cm), thereby obtaining a pressure molded product of plate form having a thickness of 0.8 mm. The pressure molded product of plate form was passed through a granulator, to produce a molded oxygen absorbent composition of granular form having a particle size of about 1.5 mmφ and an apparent specific density of about 1.5 times.

Next, 1 g of the obtained molded oxygen absorbent composition was packed in a gas barrier bag made from a Nylon/Polyethylene laminated film. Further, a sealed package of a cotton impregnated with a humectant was introduced into the bag together with 1500 mL of air of 50% relative humidity, and then the bag was hermetically sealed. The sealed bag was held at room temperature and the oxygen absorption was measured after one day and seven days.

After 7 days, it was recognized that the oxygen absorption was substantially completed. Thereafter, the sealed package of a cotton impregnated with a humectant in the gas barrier bag was broken to initiate the moisture conditioning of the atmosphere in the gas barrier bag. After 1 day and 7 days, the oxygen absorption was measured. The results are shown in Table 6.

As seen from Table 6, the oxygen absorption reaction was initiated but proceeded very slowly when the amount of water in the molded oxygen absorbent composition was used smaller than that required for completing the oxygen absorption reaction. The oxygen absorption reaction discontinued because of the deficiency of water after absorbing oxygen in an amount corresponding to the amount of water initially supported, if water was not supplemented from the atmosphere in the package. If water was supplemented from the atmosphere in the package, the oxygen absorption quickly started again.

TABLE 6

| | Oxygen absorption (cc/g composition) | | | |
|---|---|---|---|---|
| | 50% RH | | 100% RH | |
| | after 1 day | after 7 days | after 1 day* | after 7 days* |
| Example 7 | 37 | 62 | 91 | 132 |

*each from the initiation of moisture conditioning.

Example 8

An oxygen absorbent composition was prepared by mixing 100 parts (33.5%) of gallic acid, 2.1 parts (0.7%) of manganese chloride, 125.0 parts (41.8%) of sodium carbonate, 12.5 parts (4.2%) of activated carbon, 6.3 parts (2.1%) of sodium bentonite ("Neokunibond" (tradename) available from Kunimine Industries Co., Ltd.) and 3.1 parts (1.0%) of calcium carboxymethylcellulose ("E.C.G-505" (tradename) available from Nichirin Chemical Industries, Ltd.) as a swelling component, and 50.0 parts (16.7%) of water.

Using a compactor ("MRCP-80" available from Kurimoto, Ltd.), 5 kg of the oxygen absorbent composition was extruded and continuously pressure molded by a roll compression (roll compression linear pressure: 2.2 t/cm), thereby obtaining a pressure molded product of plate form having a thickness of 0.8 mm. The pressure molded product of plate form was passed through a glanulator, to produce a molded oxygen absorbent composition of granular form having a particle size of about 1.5 mmφ and an apparent specific density of about 1.5 times (apparent volume of about ⅔ time).

Next, 1 g of the obtained molded oxygen absorbent composition was packed in a gas barrier bag made from a Nylon/Polyethylene laminated film. Further, 1500 mL of air of 50% relative humidity was introduced into the bag, and then the bag was hermetically sealed. The sealed bag was held at room temperature (25° C.) and the oxygen absorption was measured after 1 day and 7 days. The results are shown in Table 7.

As seen from Table 7, although being pressured and granulated, the self reaction type, molded oxygen absorbent composition of the present invention exhibited the oxygen absorbing speed and oxygen absorption which were well comparable to those of the raw powdery mixture.

The oxygen absorbent composition of the present invention was in the form of a blackish gray block (plate or granule), and maintained the same form even after the oxygen absorption and exhibited a light gray color.

TABLE 7

50% RH

| | | Oxygen absorption (cc/g composition) | |
|---|---|---|---|
| | | after 1 day | after 7 days |
| Example 8 | granulated product | 55 | 67 |
| | plate product | 50 | 61 |
| | non-molded mixture | 56 | 70 |

Example 9

An oxygen absorbent composition was prepared by mixing 100 parts (79.1%) of an iron powder, 5.71 parts (4.5%) of calcium chloride, 5.71 parts (4.5%) of activated carbon, 8.57 parts (6.8%) of calcium bentonite ("Kunibond" (tradename) available from Kunimine Industries Co., Ltd.) as a swelling component, 0.71 part (0.6%) of tara gum ("White Gum" (tradename) available from Iwate Chemical Co., Ltd.) as a pressure molding additive (additive P), and 5.71 parts (4.5%) of water.

Using a compactor ("MRCP-80" available from Kurimoto, Ltd.), 5 kg of the oxygen absorbent composition was extruded and continuously pressure molded by a roll compression (roll compression linear pressure: 2.5 t/cm), thereby obtaining a pressure molded product of plate form having a thickness of 0.8 mm. The pressure molded product of plate form was passed through a glanulator, to produce a molded oxygen absorbent composition of granular form having a particle size of about 2 mmφ and an apparent specific density of about 1.5 times (apparent volume of about ⅔ time).

Next, 1 g of the obtained molded oxygen absorbent composition was packed in a gas barrier bag made from a Nylon/Polyethylene laminated film. Further, a cotton impregnated with a humectant was introduced into the bag together with 1500 mL of air to make the humidity to a predetermined level, and then the bag was hermetically sealed. The sealed bag was held at room temperature and the oxygen absorption was measured after two days.

Separately, in the same way as above (Experiment 1) except for changing the amount of the additive P, each granular oxygen absorbent composition was prepared, and the oxygen absorption was measured (Experiments 2-6). The results are shown in Tables 8 and 9.

Upon comparing the oxygen absorptions after 2 days in Example 9, it was recognized that the oxygen absorption was not affected by the amount or presence of tara gum. As the addition amount of tara gum was increased, the one-pass molding yield of the molded product of plate form was improved (Experiments 2-5). However, no further improvement in the molding yield was obtained when the addition amount reached 0.71 part or more (Experiments 5 and 6).

The "molding yield" is the percentage of the weight of the obtained plate product or flake product to the weight of the oxygen absorbent composition used in the continuous pressure molding process, and is hereinafter referred to merely as "molding yield" or "one-pass molding yield."

TABLE 8

Composition and Pressure of Continuous Molding in Example 9

| | Experiments | | | | | |
|---|---|---|---|---|---|---|
| | 1 | 2 | 3 | 4 | 5 | 6 |
| Composition | | | | | | |
| iron powder | 100 | 100 | 100 | 10 | 100 | 100 |
| calcium chloride | 5.71 | 5.71 | 5.71 | 5.71 | 5.71 | 5.71 |
| activated carbon | 5.71 | 5.71 | 5.71 | 5.71 | 5.71 | 5.71 |
| swelling component (BCa) | 8.57 | 8.57 | 8.57 | 8.57 | 8.57 | 8.57 |
| additive P (TG) | 0.71 | 0.4 | 0.24 | — | 0.95 | 1.42 |
| water | 5.71 | 5.71 | 5.71 | 5.71 | 5.71 | 5.71 |
| Pressure molding conditions | | | | | | |
| roll pressure (t/cm) | 2.5 | 2.5 | 2.5 | 2.5 | 2.5 | 2.5 |
| apparent specific density (times) | 1.5 | 1.5 | 1.5 | 1.5 | 1.5 | 1.5 |
| molding yield (%) | 96 | 92 | 85 | 78 | 97 | 96 |
| plate thickness (mm) | 0.8 | 0.8 | 0.8 | 0.8 | 0.8 | 0.8 |
| particle size (mmφ) | 2 | 2 | 2 | 2 | 2 | 2 |

Swelling component (BCa): Calcium bentonite
Additive P (TG): Tara gum

TABLE 9

Oxygen Absorption in Example 9

| | | oxygen absorption after 2 days (cc/g composition) | | |
|---|---|---|---|---|
| Experiments | | 100% RH | 80% RH | 60% RH |
| 1 | granulated product | 224 | 176 | 73 |
| 2 | granulated product | 220 | 177 | 77 |
| 3 | granulated product | 223 | 176 | 75 |
| 4 | granulated product | 225 | 174 | 73 |
| 5 | granulated product | 226 | 177 | 72 |
| 6 | granulated product | 226 | 176 | 73 |

What is claimed is:

1. A process for producing a molded oxygen absorbent composition, comprising a step of pressure molding an oxygen absorbent composition including an oxygen absorbing substance, water or moisture, and a swelling component capable of being swelled with water or moisture, wherein said swelling component is a bentonite and a carboxymethylcellulose.

2. The process according to claim 1, wherein the pressure molding is carried out in a continuous way, and the oxygen absorbent composition further comprises, as a pressure molding additive, a hydrophilic or water soluble thickener alone or in combination with a hydrophobic wax.

3. The process according to claim 2, wherein said oxygen absorbent composition further comprises said hydrophilic or water soluble thickener alone, in an amount of 0.2 to 6% by weight of the oxygen absorbent composition.

4. The process according to claim 2, wherein said oxygen absorbent composition further comprises both said hydrophilic or water soluble thickener and said hydrophobic wax, in amounts of 0.1 to 4.5% by weight of each of the thickener and the hydrophobic wax.

5. The process according to claim 1, comprising the further step, after the pressure molding, of granulating the pressure molded product.

6. The process according to claim 1, comprising the further step of mixing the oxygen absorbing substance, water or moisture, and the swelling component, to form the oxygen absorbent composition which is pressure molded.

7. The process according to claim 1, wherein the step of pressure molding is carried out in an inert atmosphere.

* * * * *